United States Patent [19]

Yamada

[11] 4,350,997

[45] Sep. 21, 1982

[54] LAY-OUT RECORDING METHOD IN A PICTURE SCANNING RECORDING SYSTEM

[75] Inventor: Mitsuhiko Yamada, Kyoto, Japan

[73] Assignee: Dainippon Screen Seizo Kabushiki Kaisha, Kyoto, Japan

[21] Appl. No.: 199,341

[22] Filed: Oct. 21, 1980

[30] Foreign Application Priority Data

Oct. 23, 1979 [JP] Japan .................................. 54-135879

[51] Int. Cl.³ .......................... H04N 1/46; G03F 3/00
[52] U.S. Cl. ......................................... 358/78; 358/77
[58] Field of Search ........................ 358/75, 80, 77, 78

[56] References Cited

U.S. PATENT DOCUMENTS 3,819,854 6/1974 Kolb .................................. 358/78 X
4,092,668 5/1978 Knop .................................. 358/78 X Primary Examiner—Robert L. Richardson
Attorney, Agent, or Firm—Lackenbach, Siegel, Marzullo, Presta & Aronson

[57] ABSTRACT

A method is disclosed, according to which a plurality of original pictures are reproduced on a sheet of photosensitive material with a desired lay-out plan and each at a desired magnification factor. Although the method is suitable for a real time operation, any local irregularity of the picture signal at the pick-up end is absorbed by a writing control circuit before the signals are stored in a memory device in which the picture signals are arranged so as to be read out according to the desired lay-out plan. In addition to the utilization of the memory device, the motion of the pick-up heads is controlled for obtaining the desired magnification factors and for compensating the irregularities in their motion arising from their driving means.

15 Claims, 10 Drawing Figures

FIG. 4
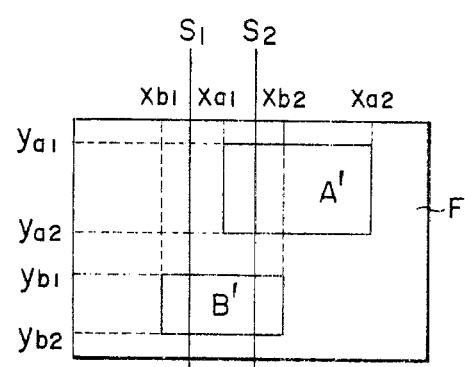
FIG. 8
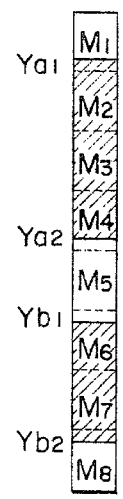
FIG. 10
FIG. 6

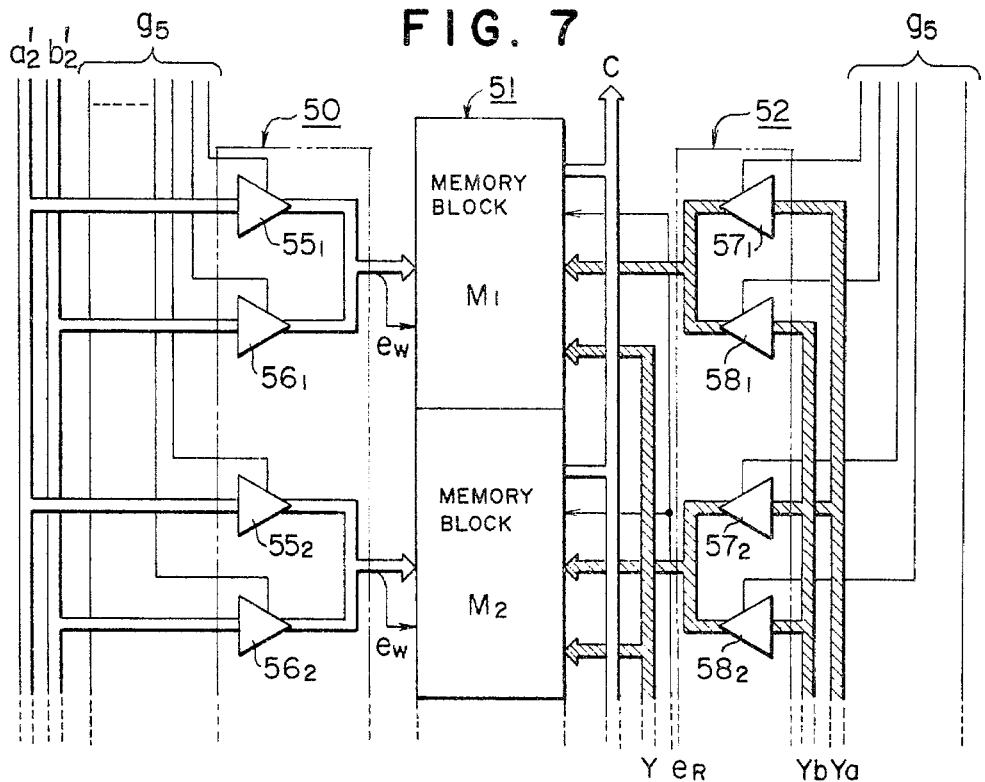
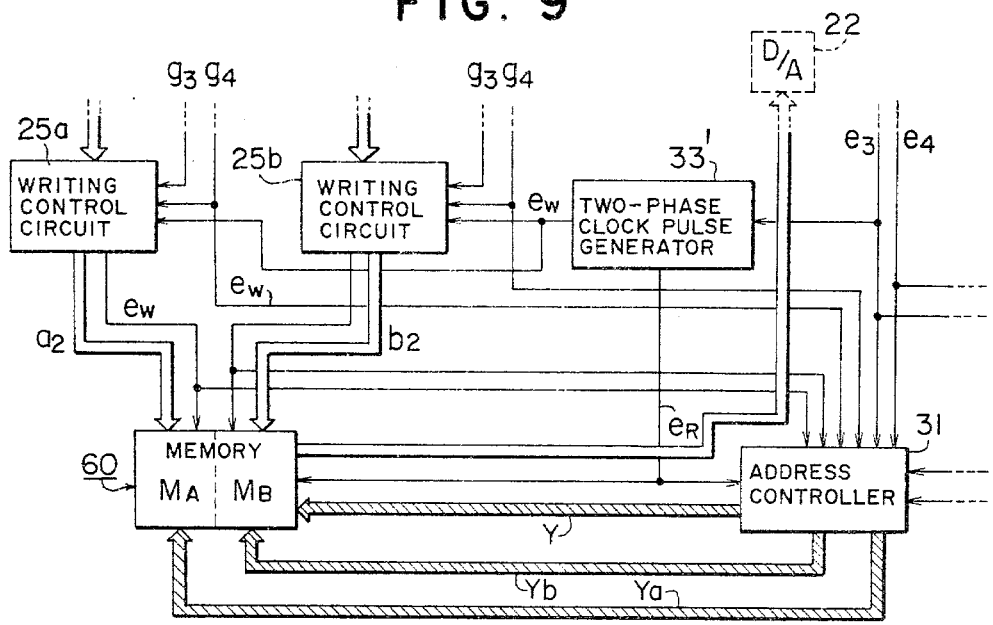

LAY-OUT RECORDING METHOD IN A PICTURE SCANNING RECORDING SYSTEM

BACKGROUND OF THE INVENTION

1. Field of the Invention

This invention relates to a real-time lay-out recording method in a plate making scanner, particularly suitable for a color scanner, a facsimile or other picture scanning device, using a plurality of original picture scanning devices for recording reproduced pictures from a plurality of original pictures on a sheet of photo-sensitive material with a desired lay-out and each at a desired magnification factor.

2. Description of the Prior Art

In recent years, as a result of developments in picture processing technologies, the research and development activities on lay-out scanners, which are capable of reproducing a plurality of original pictures on desired positions of a sheet of photo-sensitive material at a desired magnification factor, have become very active.

As one of such developments, there has been proposed a method of reproducing a plurality of original pictures on a photo-sensitive material mounted on a scanning recording device with a desired lay-out by driving a plurality of original picture scanning devices and storing the original picture signals from the scanning devices in a buffer memory according to a desired lay-out plan.

However, according to such a method, if the revolving speeds and the revolving phases of the original picture cylinders of original picture scanning devices as well as of the recording cylinder of a scanning recording device do not agree with an extremely high precision, certain discrepancies in the timings of the writing and the reading of the picture signals into and out from the buffer memory may arise, resulting in irregularities in the reproduced pictures.

SUMMARY OF THE INVENTION

In view of the above described deficiency in the proposed method, one of the primary object of this invention is to provide a lay-out recording method which does not cause such irregularities in the reproduced pictures by allowing certain local discrepancies in the revolving speeds and the revolving phases of the original picture cylinders of the original picture scanning devices as well as of the scanning recording cylinder of the scanning recording device.

Such an object is accomplished by providing a lay-out recording method comprising the steps of obtaining picture signals with corresponding photoelectrical pick-up heads, converting the original picture signals into a time series picture signal, writing the time series picture signals into specific addresses of a memory device according to a desired lay-out plan, and recording a plurality of reproduced picture from the original pictures onto a sheet of photosensitive material each at a desired magnification factor while controlling the addresses of the memory device from which the picture signals are to be recorded and the speed of each of the pick-up heads relative to speed of a recording head when reading out the picture signal from the memory device in a consecutive manner.

As another possible manner of accomplishing the above described object, this invention provides a lay-out recording method, in a picture scanning recording system, comprising the steps of obtaining picture signals in parallel from a plurality of original pictures with corresponding photoelectrical pick-up heads, writing the original pictures in parallel into specified addresses of a memory device according to a desired lay-out plan, and recording a plurality of reproduced pictures from the original pictures on a photo-sensitive material each at a desired magnification factor while controlling the addresses of the memory device from which the picture signals are read out to be recorded and the speed of each of the pick-up heads relative to the speed of a recording head when reading out the picture signals in one time series from the memory device.

In short, according to this invention, there is provided a lay-out recording method which is free from irregularities in the reproduced pictures by allowing certain local discrepancies in the revolving speeds and the revolving phases of the original picture cylinders of the original picture scanning devices as well as of the recording cylinder of the scanning recrding device.

Other novel features which are believed to be characteristic of the invention together with further objects and advantages thereof will be better understood from the following descriptions considered in connection with the accompanied drawings in which preferred embodiments of the invention is illustrated by way of example. It is also to be understood, however, that the drawings are not intended as a definition or the limitation of the invention.

BRIEF DESCRIPTION OF THE DRAWINGS

FIG. 4 shows a relation between the reproduced pictures on the recording film and the memory map of the pertinent scanning lines when recording the reproduced pictures according to the embodiment of FIG. 1, FIG. 6 is a time chart for the clock pulse generators for the embodiment of FIG. 5, FIG. 7 is an electric circuit diagram showing the circuitry surrounding the memory device of FIG. 5 in a diagrammatic view, FIG. 8 is a memory map for a pertinent scanning line in the memory device of FIG. 5, FIG. 9 is a block diagram showing yet another embodiment of the lay-out scanning recording method of this invention with regards to the portion which is different from the corresponding portions of the previous two embodiments, FIG. 10 shows a memory map for a pertinent scanning line in the memory device of the embodiment of FIG. 9.

In FIG. 1, original pictures A and B are mounted on a plurality of original picture cylinders 2, of which only two are shown in the drawing for the convenience of description, forming a part of original picture scanning devices which are generally designated as 1. These original pictures are reproduced on a sheet of recording film F which is mounted on the recording cylinder 4 of the scanning recording device 3 as reproduced pictures A' and B' with a desired lay-out and each at a desired magnification factor.

Figure 1:
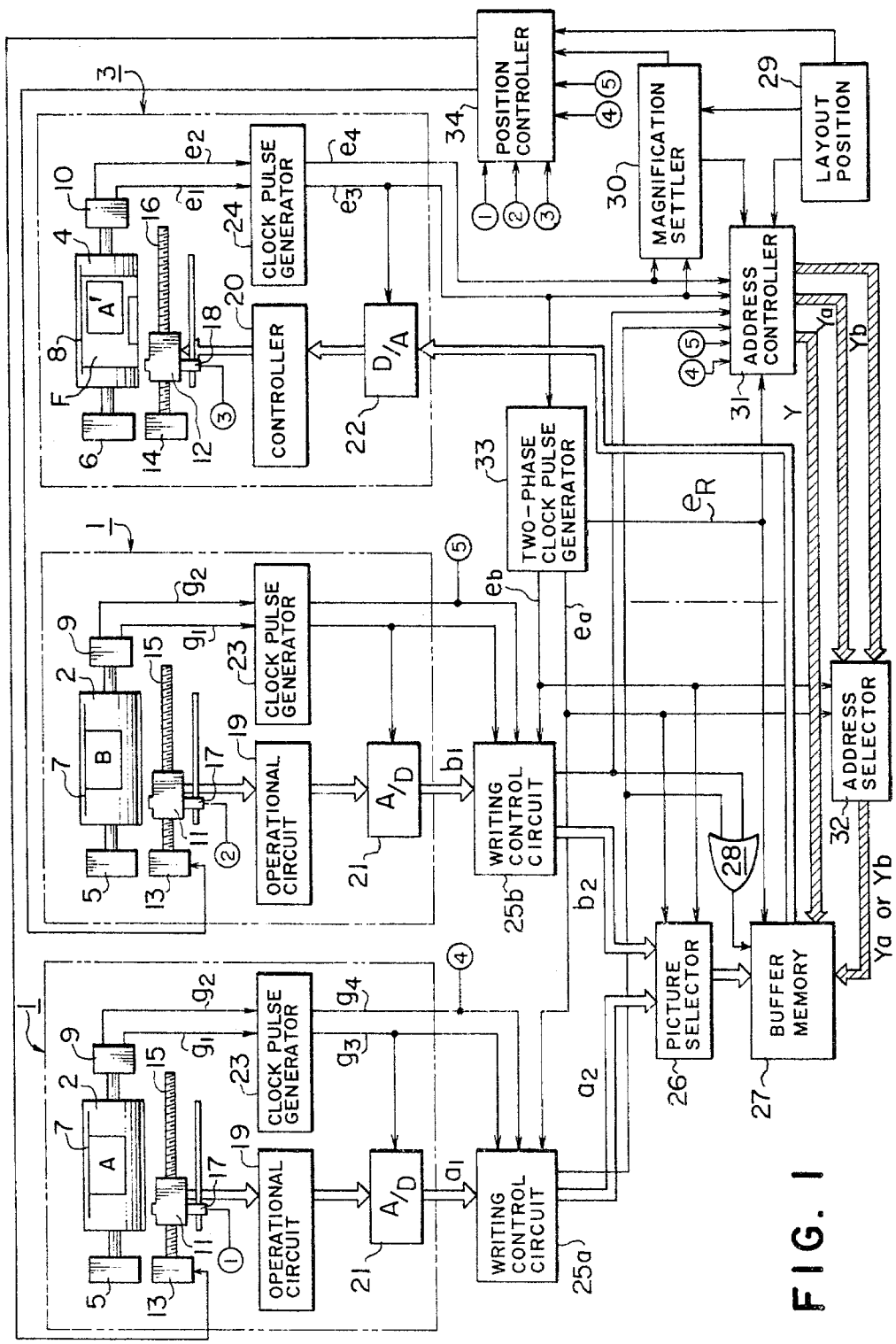
FIG. 1 is a block diagram showing an embodiment of this invention when it is applied to a color scanner.

The original picture cylinders 2 and the recording cylinder 4 are rotated by synchronous motors 5 and 6 at the same speed in a macroscopic sense and the revolving speeds of the cylinders 2 and 4 as well as the reference positions 7 and 8 are detected by rotary encoders 9 and 10 which are coaxially and integrally connected to the respective cylinders 2 and 4 and converted into electric signals. Pick-up heads 11 which photoelectrically scan the original pictures A and B are mounted on screw rods 15 which are driven by pulse motors 13 in such a manner that the pick-up heads 11 are fed along the axial lines of the original picture cylinders 2 or in the secondary scanning direction covering the whole area of the original pictures in cooperation with the original picture cylinders 2 which are rotatively driven in the primary scanning direction. The recording head 12 is similarly mounted to a screw rod 16 which is also driven by a pulse motor 14 and is fed to the secondary scanning direction.

While the recording head 12 is fed in the secondary scanning direction at a substantially constant speed by the pulse motor 14, the feed speed of each of the pick-up heads 11 which are driven by the pulse motors 13 is controlled by a position controller 34 so as to record the reproduced pictures A' and B' at precise locations on the recording film F according to a desired lay-out plan. Also, when a size magnification or a reduction is required to be done, the feed speed of the pertinent scanning head is controlled accordingly.

The picture signals supplied from the pick-up heads 11 are then sent to operational circuits 19, in which various signal processings required for making color separated printing plates with a color scanner, including color correction, tone compensation, detail enhancement, etc. These operational circuits 19 are indicated as analog circuits in this particular embodiment but may be of any known digital circuits. In such a case, an analog digital converter 21 will be required to be placed before the operational circuit 19 instead of after it. An analog-digital converter will be referred to as an A/D converter hereinafter for simplicity's sake.

The output for each of the operational circuits 19 is then supplied to the A/D converter 21 which in turn produces a picture signal $a_1$ or $b_1$ which is digitalized by clock pulses $g_3$ produced from a clock pulse generator 23 in accordance with timing pulses $g_1$ produced from one of the rotary encoders 9. Therefore, the picture signals $a_1$ and $b_1$ are produced according to the timings of the original picture cylinder rotations.

What is more, the reference position 7 is also detected by the rotary encoder 9 which produces a pulse $g_2$ for indicating the detection of the reference position 7. This pulse $g_2$ is received by the clock pulse generator 23 and is made to correspond to a pulse signal $g_4$ which is used for controlling the lay-out of the pictures on the recording film F.

The picture signals $a_1$ and $b_1$ are then supplied to writing timing control circuits 25a and 25b, respectively, which are arranged for controlling the writing timings for the picture signals $a_1$ and $b_1$ to be written into a buffer memory 27 via a picture selector 26. The picture selector 26 essentially functions as a switch which selects the picture signals from the writing control circuits 25a and 25b alternatively to the buffer memory 27.

Figure 2:
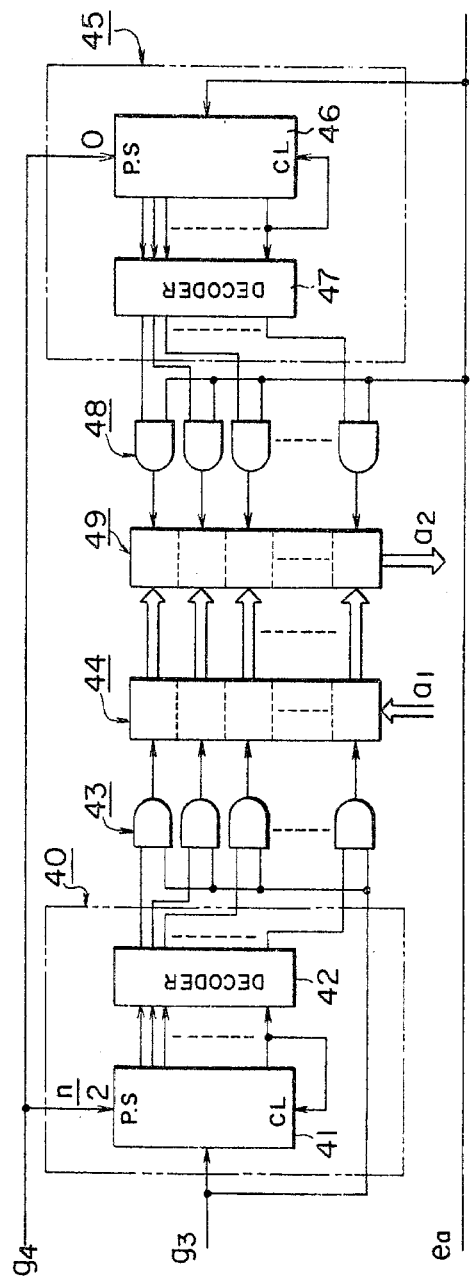
FIG. 2 is an electric circuit diagram of an example of memory writing control circuit in FIG. 1.

As shown in FIG. 2, this writing control circuit 25a comprises a ring counter 40 consisitng of a base n binary counter 41 and a base n decoder 42 for converting the output of the base n binary counter 41 into a selective signal, meaning that only one of the outputs of decoder 42 assumes a high level state in an ascending manner. When the last output of the decoder has taken a high state, then another count at the base n counter 41 clears the counter 41 and brings the first output of the decoder to a high level state all over again. The n outputs of the decoder 42 are connected in parallel to n AND gates 43 which recieve the clock signals $g_3$ from the clock generator 23 as their gate signals, and then to n latch circuits 44.

The writing control circuit 25a further comprises another ring counter 45 also consisting of a base n binary counter 46 and a base n decoder 47 for converting the output of the base n binary counter 46. The n outputs from the decoder 47 are likewise connected in parallel to n AND gates 48 which receive timing pulses $e_a$ from a two-phase clock generator 33 (FIG. 1) which is controlled by the timing of the recording end. And the outputs of the AND gates 48 are connected in parallel to a data selector 49. The n registers in the data selector 49 automatically copy the contents of the n registers of the latch circuit 44.

Therefore, the overall function of the writing control circuit 25a is to function as a buffer between the pick-up end and the recording end and compensate for the possible local irregularity in the scanning timing at the pick-up end. Since there are n registers in each of the latch circuit 44 and the data selector 49, the writing control circuit 25a can absorb $\pm$ n/2 of either delay or advance in the pick-up timing relative to the recording timing at the recording end.

The writing control circuit 25b functions in a similar manner with respect to the picture signal $b_1$ and send its output $b_2$ to the picture selector 26.

Figure 3:
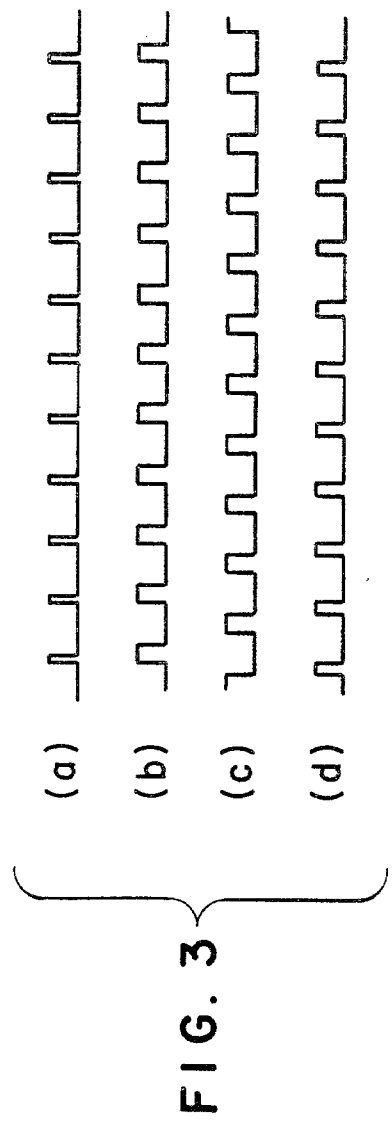
FIG. 3 shows the output waveforms of the two-phase clockpulse generator.

Now refering to FIG. 3, (a) represents the waveform of the clock pulse $e_3$ generated from the clock pulse generator 24. According to the timing of this clock pulse $e_3$, the two-phase clock pulse generator 33 produces clock pulse signals $e_a$ and $e_b$ which have a phase difference of 180 degrees and have a duty factor less than 50%. By supplying these clock pulse signals $e_a$ and $e_b$ to the writing control circuits 25a and 25b as well as to the picture selector 26, the picture signals $a_2$ and $b_2$ are alternatingly written into the buffer memory 27. Also, since the picture signals $e_a$ and $e_b$ have a duty factor which is less than 50%, it is possible to allocate a read command signal $e_R$ for the buffer memory 27 as shown in (d) in FIG. 3. Hence, the buffer memory 27 may be a simple memory which allows only one access at a time, either writing or reading.

Now, in conjunction with the switching action of the picture selector 26 for the picture signals $a_2$ and $b_2$, an address selector 32, also timed by the two-phase clock signals $e_a$ and $e_b$, switches address signals $Y_a$ and $Y_b$ for allocating an address of the buffer memory 27 to each of the digital original picture signals $a_2$ and $b_2$. These address signals $Y_a$ and $Y_b$ are given, via an address controller 31, by the command signal from the lay-out position device 29 consisting of a digitizer or the like, according to a desired lay-out plan.

At the same time, via the writing control circuits 25a and 25b, the two-phase clock signals $e_a$ and $e_b$ are supplied to the address controller 31 in synchronization with the picture signals $a_2$ and $b_2$ for advancing the writing addresses in the buffer memory with the address signals $Y_a$ and $Y_b$. The same clock signals $e_a$ and $e_b$ are also supplied to the buffer memory itself 27, via an OR circuit 28, for commanding the writing into the buffer memory 27.

The two-phase clock pulse generator 33 also produces the read-out command signal $e_R$ and supplies to both the address controller 31 and the buffer memory 27 so that the picture signals $a_2$ and $b_2$ which are written into the buffer memory 27 as described above are read out according to the command from the address controller 31 which receives the control signal from the lay-out position device 29. Since the original picture signals $a_2$ and $b_2$ are already stored in the memory device 27 in an arrangement which corresponds to the desired lay-out, the picture signals $a_2$ and $b_2$ are simply read out from the buffer memory 27 and are sent to a D/A converter 22. The analog signal produced from the D/A converter 22 is then sent to a controller 20 which directly controls the light beam which is produced from the recording head 18 and pictures with the desired lay-out are thus formed on the recording film F as it is scanned by the recording head 12. In FIG. 1, the reproduced picture A' is shown on the recording film while the reproduced picture B' is partially hidden behind the recording cylinder 4.

Here, the rotary encoder 10 produces, on one hand, the clock pulses $e_1$ which is supplied to the clock pulse generator 24. And, in synchronization with these pulses, the clock pulse generator 24 produces the timing pulse $e_3$ which serves as the basis for the two-phase clock generator 33 as mentioned before. On the other hand, the rotary encoder 10 also produces pulses $e_2$ which represents the detection of the reference position 8 on the recording film F. The clock pulse generator 24 then produces a reference signal $e_4$ according to the pulses $e_2$ and send the signal $e_4$ to the address controller 31 and the magnification settler 30 for attaining the desired lay-out on the recording film F.

Thus it is clear from above description that, while the original pictures $a_1$ and $b_1$ are obtained essentially according to the timing of the pick-up end, the access to the memory as well as the recording at the recording end are accomplished according to the timing of the recording end or, specifically, the output from the rotary encoder 10.

If size magnification or reduction is required when reproducing a picture on the recording film F, it can be accomplished by repeating or omitting some of the read out from the buffer memory 27. This is accomplished by properly adjusting a magnification settler 30 which directly controls the address controller 31, particularly its read-out signal Y.

According to this arrangement, the original pictures A and B are reproduced on the recording film F and A' and B' according to the desired lay-out plan only if the coordinates specified in the lay-out position device 29 are made to correspond to the address in the buffer memory 27 as well as to the positions on the recording film F which is mounted on the recording cylinder 4. However, it is still necessary to control the positions of the reproduced pictures A' and B' with respect to the secondary scanning direction using an additional arrangement.

To be specific, according to a method as described above in which the recording head 12 is fed in the secondary scanning direction at a constant speed and the feed speed of each of the pick-up heads 11 in the secondary scanning direction is controlled according to a desired magnification factor for actually realizing a desired magnification factor in the recording process, the starting point for the reproduced pictures in the secondary direction may shift by a few scanning lines since the reponse time of the pulse motors 13 for driving the pick-up heads 11 upon application of a voltage on them or, in other words, the response time corresponding to the time required for obtaining the revolution rate which corresponds the applied voltage after applying the voltage to the motors 13 may vary depending on the voltage which has been previously applied to the motors 13 and the variations in the applied voltage itself as is commonly known to people skilled in the art.

On the other hand, according to this invention, the position of the recording head 12 relative to its starting point as well as the positions of the pick-up heads 11 relative to their starting points are detected by linear encoders 17 and 18 and the starting points on the recording on the recording film F and the corresponding starting points of the scanning of the original pictures A and B are made to agree at least to a substantial extent by a position controller 34 thereby eliminating the above described difficulty. By doing so, a desired magnification as well as a desired lay-out are obtained for each of the reproduced pictures on the recording film at the same time.

According to the embodiment shown in FIG. 1, an one-line memory, which has a memory capacity corresponding to one scanning line at the recording end, is used as the buffer memory 27 and, in this case, the picture signals $a_2$ and $b_2$ are written into the buffere memory 27 in a time sharing mode (alternatingly, for example) according to the signal from the lay-out position device 29 to which the desired lay-out plan is pre-programmed.

FIG. 4 shows how the picture signals $a_2$ and $b_2$ corresponding to the reproduced pictures A' and B' on the recording film F are written into the buffer memory 27 for each scanning line.

In this case, since the addresses of the buffer memory 27 and the positions on the recording film F mounted on the recording cylinder 4 with respect to its secondary scanning direction are made in advance to associate to one another, the positions $y_{a1}$, $y_{a2}$, $y_{b1}$ and $y_{b2}$ on the recording film F correspond to the addresses $Y_{a1}$, $Y_{a2}$, $Y_{b1}$ and $Y_{b2}$, respectively, and the scanning line $S_1$, for example, is stored by writing the picture signal $b_2$ into the addresses from $Y_{b1}$ to $Y_{b2}$ while the scanning line $S_2$ is stored by writing the picture signals $a_2$ and $b_2$ in the addresses from $Y_{a1}$ to $Y_{a2}$ and from $Y_{b1}$ to $Y_{b2}$, respectively.

Meanwhile, the picture signals $a_2$ and $b_2$ thus written into the buffer memory 27 are read out in an ascending order from address zero by the read-out address signal Y produced from the address control circuit 31 in synchronization with the clock pulse $e_3$ of the recording end.

Figure 5:
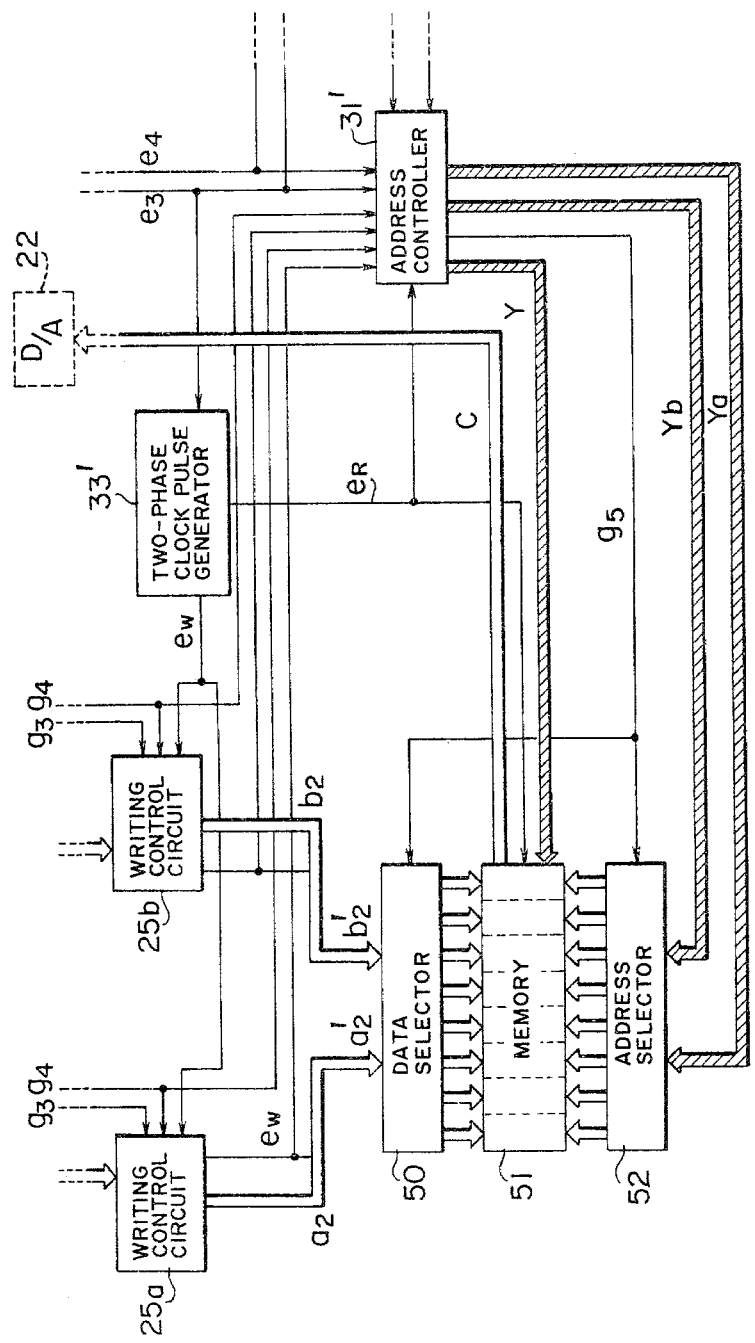
FIG. 5 is a block diagram showing another embodiment of the lay-out scanning recording method of this invention with its portions identical to those of the embodiment in FIG. 1 being omitted.

FIG. 5 shows another embodiment of this invention with the portions identical to those of the first embodiment in FIG. 1 omitted. And like parts are designated with like numberals. In this embodiment, the buffer memory 27 comprises a memory 51 consisting of a plurality of memory blocks, from $M_1$ to $M_8$ for example, each of which allowing a writing access independently from another. Therefore, in this case, it is not necessary to write the picture signals $a_2'$ and $b_2'$ into the memory 51 in a time sharing mode as was the case in the previous embodiment. According to this embodiment, the writing of picture signals into the memory can be accomplished in no more time than is required for reading them even when the volume of the picture signals $a_2'$ and $b_2'$ are considerably increased.

The two-phase clock pulse generator $33'$ of this embodiment is also slightly different from the two-phase clock pulse generator 33 of the first embodiment. FIG. 6 shows the waveform for each of the pulses produced from this clock pulse generator 33. The clock pulse generator $33'$ receives the timing pulses $e_3$ (shown as (a) in FIG. 6) and produces the writing command signal $e_W$ as indicated by (b) in FIG. 6 and the reading-out command signal $e_R$ as indicated by (c) in FIG. 6, with a phase different of approximately 180 degrees therebetween.

FIG. 7 shows the structures of a data selector 50 and an address selector 52 in a greater detail. In the data selector 50, the picture signals $a_2'$ and $b_2'$ are written into the memory 51 selectively through bus buffers $55_1$, $55_2$, ... and $56_1$, $56_2$, ... which receive selection gate signals $g_5$. And the bus buffers $55_1$, ... and $56_1$, ... are provided for each of the memory blocks $M_1$, $M_2$, ... so as to allow writing access to each of the memory blocks at the same time. In the address selector 52, there are likewise provided a pair of bus buffers $57_1$ and $58_1$, $57_2$ and $58_2$, ... for each of the memory blocks $M_1$, $M_2$, ... so as to allow the address controller 31 to read the content in the memory 51 in a desired order as specified by address controller 31 (by the signals Y, $Y_a$ and $Y_b$) and according to the timing of the selection gate signal $g_5$ which closely corresponds to the timing pulse $e_3$ of the recording end.

Therefore, when writing the picture signals corresponding to the scanning line $S_2$ shown in FIG. 4 into the memory 51, the picture signals $a_2'$ and $b_2'$ are simultaneously written into the addresses from $Y_{a1}$ in the memory block $M_1$ and the addresses from $Y_{b1}$ in the memory block $M_6$, respectively, thereby requiring substantially less time than in the case of the first embodiment.

When two reproduced pictures happen to be very close to each other along the primary scanning direction, or when the end point of one picture and the starting point of another picture are very close from one another, it becomes necessary to write the picture signals for the both pictures in one common memory block but it is not possible with a usual arrangement. In such a case, the difficulty can be avoided either by dividing the block into finer blocks or by shifting the addresses of the picture signals for one of the pictures by appropriate number of addresses into another memory block for avoiding the overlapping of the memory block for the two pictures.

The picture signals $a_2$ and $b_2$, which are thus written into the memory blocks $M_1 \sim M_8$ in parallel, are then read out according to the read-out command signal $e_R$ and the read-out address signal Y in series or from address zero of the first memory block $M_1$ to the last address of the memory block $M_8$ in the order as the addresses are arranged.

FIG. 9 shows yet another embodiment in which line memories $M_A$ and $M_B$, each having a capacity corresponding to one scanning line at the recording end, are used as the memory device 60 instead of the buffer memory 27 of the first embodiment. In this case also, it is not necessary to conduct the writing process in a time sharing mode as was the case in the first embodiment but in parallel as was the case in the second embodiment.

According to this embodiment, the picture signals $a_2$ produced from the writing control circuit $25a$ is written into the memory $M_A$ from a specific address $Y_{a1}$ (FIG. 10) according to the command of the address signal $Y_a$ produced from the address controller 31 while the picture signal $b_2$ is written into the memory $M_B$ from a specific address $Y_{b1}$ (FIG. 10) according to the address signal $Y_b$, more or less independently from another. In this case, the timings for the write command signal $e_W$ as well as the read-out command signal $e_R$ may be the same as in the second embodiment shown in FIG. 5.

In short, according to the method of this invention, it is possible to record the reproduced pictures of the original pictures mounted on a plurality of original picture scanning devices with a desired lay-out and each at a desired magnification factor in a real-time operation.

Although, in the above description, the embodiments were concerned with a case where one original picture was mounted on each of the original picture scanning devices, this invention is equally applicable to a case where a plurality of original pictures are mounted on a original picture scanning device and it is desired to record each of the reproduced pictures with a desired lay-out and at a desired magnification factor, as long as the original pictures are scanned in the order of their appearance in the final recorded film.

Also, it is obvious to a person skilled in the art that, although the scanning cylinders and the recording cylinders were driven by separate synchronous motors, it is equally possible to mount the original pictures and the recording film on cylinders which are coaxially and integrally connected with one another.

We claim:

1. A lay-out recording method in a picture scanning recording device, comprising the steps of:
   obtaining picture signals concurrently from a plurality of original pictures with corresponding photoelectrical pick-up heads,
   storing the picture signals, for subsequent extracting of said signals serially
   writing the time series picture signals into specific addresses of a memory device, and
   recording a plurality of reproduced pictures from the original pictures on a photo-sensitive film each at a desired magnification factor while selecting the addresses of the memory device from which the picture signals are to be recorded and the speed of each of the pick-up heads relative to the speed of a recording head when reading out the picture signal from the memory device in a consecutive manner.

2. A lay-out recording method according to claim 1, wherein the memory device consists of a line memory having a memory capacity substantially corresponding to one scanning line of the recording end and the picture signals obtained from the original pictures are written into the memory device alternatively at addresses which are specified by a predetermined lay-out plan.

3. A lay-out recording method according to claim 2, wherein the original pictures are mounted on original picture cylinders which are separately driven by motors which are electrically synchronized with one another.

4. A lay-out recording method according to claim 2, wherein the original pictures are mounted on original picture cylinders which are coaxially driven by one motor.

5. A lay-out recording method according to claim 3 or 4, wherein each of the original picture signals is stored in a buffer memory having a capacity substantially less than a capacity corresponding to one scanning line of either the recording end or the pick-up end for compensating irregularities in the signal train of the original picture signals before being sent to the memory device.

6. A lay-out recording method according to any one of claims 1-4 including the step of processing the picture signal, subsequent to the step of obtaining the picture signals from each of the pick-up heads, for color correction, tone compensation, detail enchancement, etc. which are required in making a color separation plate with a color scanner.

7. A lay-out recording method in a picture scanning recording device, comprising the steps of:
obtaining picture signals concurrently from a plurality of original pictures with corresponding photoelectrical pick-up heads,
writing the original pictures in via parallel channels into specified addresses of a memory device, and
recording a plurality of reproduced pictures from the original pictures on a photo-sensitive material each at a desired magnification factor while selecting the addresses of the memory device from which the picture signals are read out to be recorded, said selecting of addresses being in accord with the speed of each of the pick-up heads relative to the speed of a recording head when reading out the picture signals in one time series from the memory device.

8. A lay-out recording method according to claim 7, wherein the memory device consists of a line memory having a capacity substantially corresponding to one scanning line of the recording end and being divided into a plurality of memory blocks, each comprising a plurality of memory addresses, and the picture signals are written into corresponding addresses located in different memory blocks, in parallel, according to the desired lay-out plan.

9. A lay-out recording method according to claim 8, wherein the original pictures are mounted on original picture cylinders which are separately driven by motors which are electrically synchronized with one another.

10. A lay-out recording method according to claim 8, wherein the original pictures are mounted on original picture cylinders which are coaxially driven by one motor.

11. A lay-out recording method according to claim 7, wherein the memory device consists of a plurality of line memories each having a memory capacity corresponding to one scanning line at the recording end and the picture signal obtained from each of the original pictures is written into a corresponding one of the line memories.

12. A lay-out recording method according to claim 11, wherein the original pictures are mounted on original picture cylinders which are separately driven by motors which are electrically synchronized with one another.

13. A lay-out recording method according to claim 11, wherein the original pictures are mounted on original picture cylinders which are coaxially driven by one motor.

14. A lay-out recording method according to claim 9, 10, 12 or 13, wherein each of the original picture signal is stored in a buffer memory having a memory capacity substantially less than a capacity which corresponds to one scanning line either at the recording and or at the pick-up end for compensating irregularities in the signal train of each of the original picture signals before being sent to the memory device.

15. A lay-out recording method according to claim 14, further comprising the step of processing the original picture signal obtained form each of the original pictures for color correction, tone compensation, detail enhancement, etc. which are required in making color separation plate with a color scanner.

* * * * *